Patented July 25, 1939

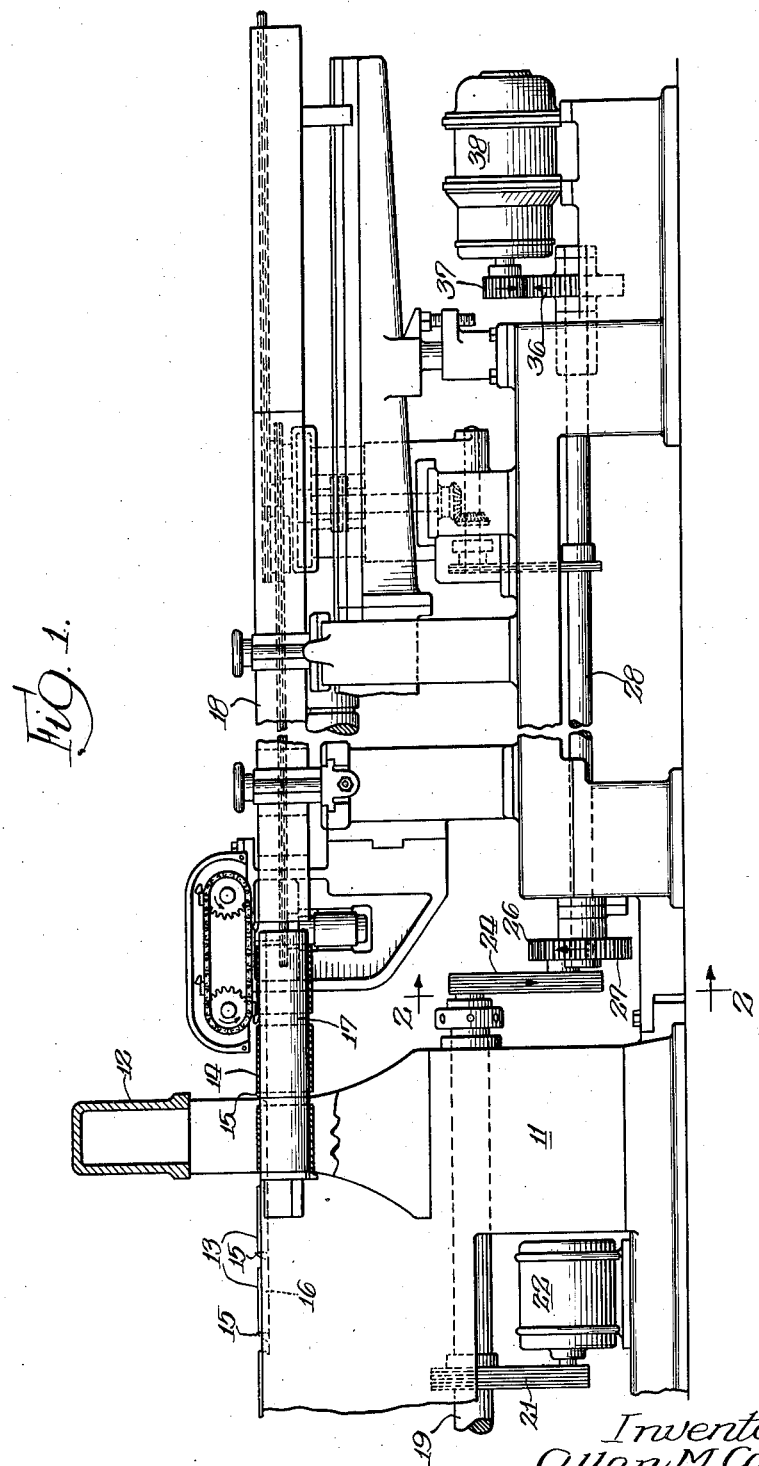

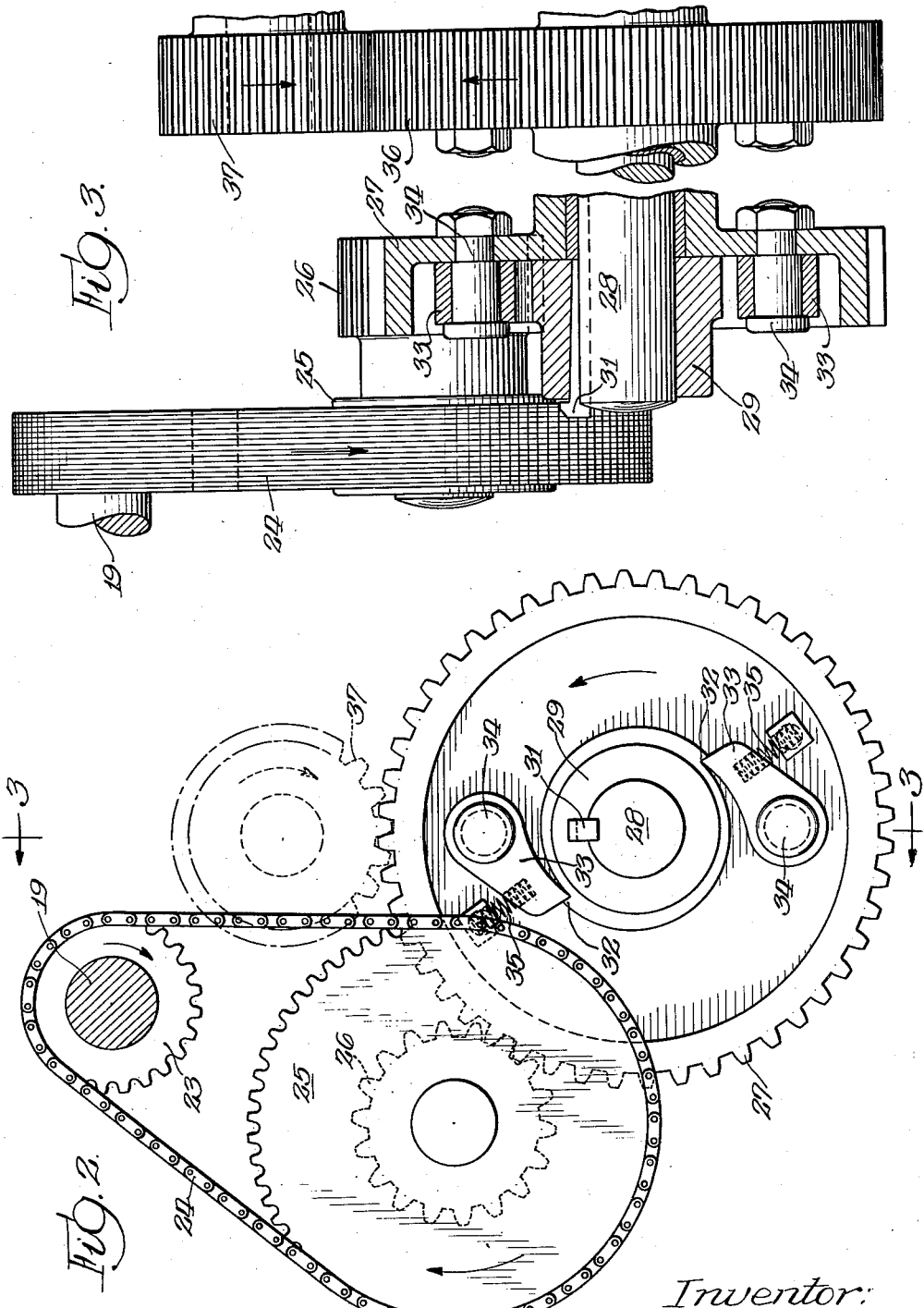

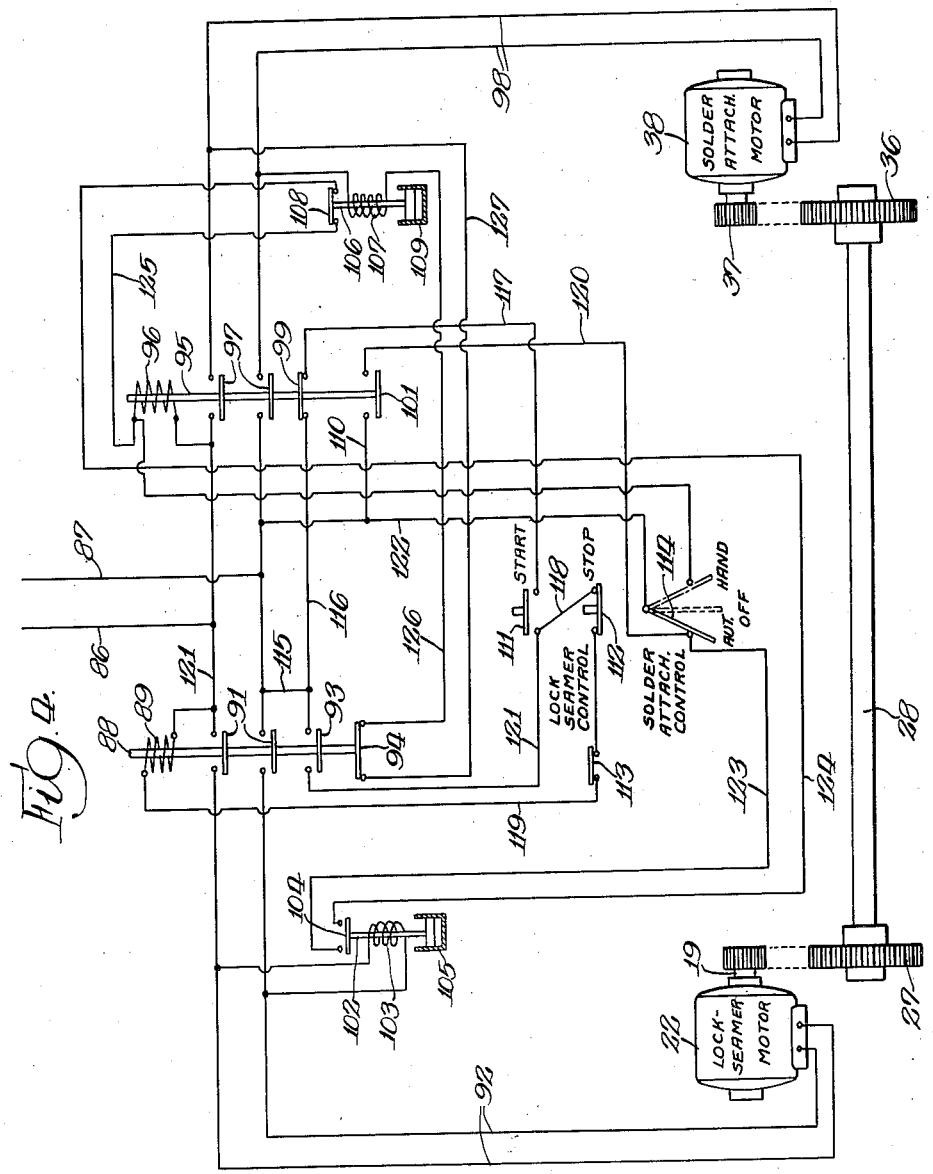

2,167,330

UNITED STATES PATENT OFFICE 2,167,330

DRIVE MECHANISM FOR LOCK SEAM SOLDERING ATTACHMENTS

Allan M. Cameron, Oak Park, Ill., assignor to Cameron Can Machinery Co., Chicago, Ill., a corporation of Illinois Original application May 20, 1937, Serial No. 143,715. Divided and this application October 21, 1937, Serial No. 170,197

6 Claims. (Cl. 113—61)

This invention relates in general to can making machinery and more particularly to the mechanism for soldering the side seams of the can bodies which are formed and delivered by the lock seamer. Such soldering mechanism, which is really a machine in and of itself to which the formed bodies are delivered by the body maker, is commercially known as a soldering attachment and will be so designated herein. The present application is a division of my pending application Serial No. 143,715, filed May 20, 1937.

The lock seamer by which the can bodies are formed and their edges are interlocked delivers the bodies in rapid succession to the soldering attachment by which solder is applied to the interlocked side seams for sealing and strengthening purposes. Modern lock seamers are equipped with various safety devices by which the current to the lock seamer driving motor is shut off when a jam is produced or other defect in the operation of the lock seamer occurs. The opening of the motor circuit, of course, promptly stops the lock seamer but if the soldering attachment were simultaneously stopped, the can bodies remaining in the attachment would be subjected to such excessive heat from the soldering mechanism that they would be injured and rendered incapable of use. It is essential, therefore, that the soldering attachment be continued in operation after the stopping of the lock seamer a sufficient length of time to clear all the can bodies from the attachment.

One of the purposes of my present invention, therefore, is to provide a drive for the soldering attachment which during a normal operation will maintain the soldering attachment in synchronism with the lock seamer so that the can bodies will be fed from one to the other in proper timed relation and without liability of producing jams or injuring the bodies and which, when the lock seamer is stopped, will continue the operation of the soldering attachment until all of the bodies are cleared therefrom and which, furthermore, will automatically reestablish the properly timed and synchronized relation between the lock seamer and the soldering attachment so that when the machine is again started up the can bodies will be advanced through the machines in proper timed and spaced relation.

In some machines heretofore in use, the stopping of the lock seamer caused the stopping of the soldering attachment as well, and after a brief interval the soldering attachment was started again to clear the can bodies. Such machines, however, have proven somewhat dangerous in use because the operator, when the machine was stopped, has been known to contact some part of the machine at rest which then became set in motion as the soldering mechanism started to clear the bodies with the result that injuries have occurred. My present invention obviates such accidents by continuing the operation of the soldering attachment without interruption until the can bodies are all cleared therefrom, whereupon the soldering attachment is also stopped and remains quiescent until manually started again.

Another purpose of my invention is to provide a control system for the mechanisms which, when the machine is started, will cause both the lock seamer and the soldering attachment to be started and driven in synchronism by a main motor and after a short predetermined interval will start an auxiliary motor which will simply run idle at a slower speed than the main motor until such time as the main motor may shut off and stop the lock seamer, whereupon the auxiliary motor, after clearing the can bodies from the soldering attachment, will be automatically stopped and will remain dead until subsequently started by the starting of the main motor or until independently started by a manual control.

Other objects and many of the inherent advantages of my invention will be appreciated as the same becomes better understood by reference to the following description when considered in connection with the accompanying drawings.

Referring to the drawings:

Fig. 1 is a side elevation of a portion of the lock seamer and a soldering attachment constructed in accordance with the principles of my invention;

Fig. 2 is an enlarged detail view taken on the line 2—2 of Fig. 1;

Fig. 3 is a view partially in section taken on the line 3—3 of Fig. 2; and

Fig. 4 is a diagrammatic layout of the motor circuits.

Referring to the drawings more in detail, reference character 11, Fig. 1, indicates generally the rear portion of a lock seam body maker, the arch 12 of which carries the forming wings and bumping mechanism by which the side seams of the can bodies are locked and bumped. These mechanisms are of well-known construction and their illustration here is deemed unnecessary. It may be stated, however, that the body blanks 13 which have been edged and notched by suitable mechanisms are fed to the forming station and the cylindrical bodies 14 formed from these blanks are fed from the forming station by feed dogs 15 carried by a reciprocatory feed bar 16 in the usual manner. The bodies are discharged from the forming station along an internal horn 17 and in the soldering attachment are conveyed past the soldering mechanism through an external horn 18.

The various mechanisms of the lock seamer are operated from a main shaft 19 which is driven through a chain or belt drive 21 from a motor 22 which will hereafter be referred to as the main motor. The shaft 19 projects at the rear end of the lock seamer where it is provided with a sprocket wheel 23 which is connected through a chain drive 24 with a sprocket wheel 25, the hub of which is provided with a pinion 26 meshing with a gear wheel 27 forming the drive member of an overrunning drive clutch. This gear wheel is freely rotatable upon the main shaft 28 of the soldering attachment and surrounds a hub 29 secured by a key 31 or otherwise to this shaft. The hub is provided with two or more peripheral teeth 32 adapted to be engaged and driven by companion dogs 33 pivotally carried by the gear 27 upon stud bolts 34 and urged into cooperative relation with the teeth 33 by expansion springs 35. The main motor 22, therefore, serves not only to operate the lock seamer but also to operate the various mechanisms of the soldering attachment through the shaft 28 and the overrunning drive clutch between the shafts 19 and 28. It will be apparent, therefore, that through this drive connection the soldering attachment is operated in timed and synchronized relation with the lock seamer so that the can bodies delivered by the lock seamer are picked up and carried through the soldering attachment without interruption of the timing.

The opposite end of the shaft 28 is provided with a similar overrunning drive clutch housed within a drive gear 36 (Fig. 3). The details of this second drive clutch being substantially identical with the one just described, detailed description and illustration thereof is unnecessary for its understanding. The gear 36 meshes with and is driven by a pinion 37 mounted on the shaft of a second motor 38 which will be referred to hereafter as the auxiliary motor. This is a smaller motor than the main motor 22 and is designed to operate at a slower speed so that when the motor 22 is operating to drive the shaft 28 the motor 38 simply idles as the teeth of its overrunning drive clutch pass beneath the spring pressed dogs housed in the gear wheel 36. When, however, the main motor is stopped the shaft 28, as its speed drops to that of the gear 36, is picked up by the clutch dogs carried by this gear and driven by the auxiliary motor 38 so as to continue the operation of the soldering attachment until the can bodies have been cleared therefrom. During the operation of the soldering attachment by the motor 38, the drive teeth 32 of the overdrive clutch housed in the gear 27 pass beneath the drive dogs 33 which, when the motor 22 is at rest, remain stationary.

The various mechanisms of the soldering attachment are driven from shaft 28 through suitable drive trains upon which it is unnecessary to here elaborate, as such trains and the mechanisms themselves are fully disclosed in my parent application above identified.

My invention embodies also a control system for these motors by which the main motor is first started to set the lock seamer and the soldering attachment into operation; then the auxiliary motor is started which operates at a slower speed than the main motor and, therefore, because of the overrunning drive clutch in the gear 36, simply idles during normal operation of the machines. When, however, the main motor is stopped for any reason, thus stopping the lock seamer, the auxiliary motor continues the operation of the soldering attachment at a slower speed until the can bodies are freed therefrom, whereupon the auxiliary motor also stops. The control system is also designed to enable the auxiliary motor to operate the soldering attachment under manual control whenever desired, but in that instance the main motor is locked out of operation.

The control system by which the motors are controlled to operate in the manner above indicated is illustrated in Fig. 4 to which reference is now made. Current for the motors and the control circuits is supplied by the power leads 86 and 87. A core 88 of a solenoid 89 carries the switch 91 which connects the power leads with the main motor circuit 92 and carries also the switches 93 and 94. The core 95 of a solenoid 96 carries the switch 97 which connects the power leads with the auxiliary motor circuit 98 and also carries the switches 99 and 101. The core 102 of a timing solenoid 103 carries a switch 104 and the action of this solenoid is delayed by a dashpot device 105 of well-known construction. The core 106 of a solenoid 107 carries a switch 108 and the operation of this solenoid is also delayed by a similar dashpot device 109. The normally open starting switch is designated by 111, the normally closed stopping switch by 112, and one of several emergency stop switches with which the lock seamer is equipped for the purpose of stopping the lock seamer upon the occurrence of a jam or other defect in operation is indicated by 113. A hand controlled switch diagrammatically illustrated is indicated by 114. In the position in which the parts are shown on the drawings, the circuits are open, the motors are at rest, and the solenoids are deenergized.

To start the machine the starting button is depressed, momentarily closing the switch 111 which initiates a current flow from power lead 87 through lines 115, 116 to the switch 99 to the line 117, switch 111, line 118, normally closed stopping switch 112, line 119, solenoid coil 89 and line 121 to lead 86. Energization of solenoid 89 closes switch 91, causing delivery of power current through circuit 92 to the main motor 22 which is thereby set in operation. Simultaneously switch 93 is closed thereby maintaining energization of solenoid 89 through switch 93, line 121 and lines 118 and 119. This circuit replaces the energizing circuit momentarily established by the temporary closing of the starting switch 111.

Current in the circuit 92 is shunted through solenoid 103 and after a predetermined time interval determined by the setting of the dashpot device 105, the switch 104 is closed. Assuming that the control device 114 is in the full line position shown and indicated as "AUT", circuit is now established from lead 87 through line 122, control device 114, line 123, switch 104, line 124, switch 108, line 125, solenoid coil 96 and line 121 to lead 86. Energization of solenoid 96 closes switch 97, thereby delivering current to circuit 98 which starts auxiliary motor 38. Switch 99 is simultaneously opened, thereby rendering accidental operation of starting switch 111 ineffective. Both motors will now continue to operate main motor 22 driving the lock seamer and the soldering attachment and auxiliary motor 38 running idle. Should the control lever 114, either accidentally or otherwise, be thrown to "off" position, the auxiliary motor would not be stopped because the circuit energizing its starting solenoid 96 would then be closed through the alternative circuit comprising line 110, switch 101 and line 120.

Assume now that one of the emergency switches 113 or the manual stop switch 112 is opened for the purpose of stopping the lock seamer. The energizing circuit for the solenoid 89 is thereby broken and the switches carried by the core 88 will reassume the position shown on the drawings. This will break the circuit 92 stopping the main motor, will open switch 93 and will close the switch 94. The closing of this switch will establish a circuit through solenoid 107, line 126, switch 94 and line 127, thereby energizing this solenoid and causing the opening of switch 108 after a delayed time interval determined by the setting of the dashpot device 109. During this delayed time interval, the auxiliary motor 38 will pick up and continue to operate the shaft 28, thereby operating the soldering attachment to clear the can bodies therefrom. The dashpot device 109 is so set that the opening of switch 108 will be delayed sufficiently to permit the clearance of all the can bodies from the soldering attachment before the switch is opened. Upon opening of switch 108, the circuit through solenoid 96 is broken, permitting the switches carried by the core 95 to reassume the position shown on the drawings, thereby opening the auxiliary motor circuit 98 and causing this motor to stop. All of the parts are now in their original position and the operation may be repeated by simply closing the starting switch 111 whenever desired.

Should it be desired to operate the lock seamer for test purposes, for instance, without operating the soldering attachment, this may be done by first throwing the control 114 to "off" or central position indicated on the drawings. The motor 22 may then be started by manipulation of the starting switch 111, as previously explained, but the closing of switch 104 will not cause the energization of solenoid 96 to start motor 38 because the connection between lines 122 and 123 is broken at 114. The lock seamer may, therefore, be operated independently of the soldering attachment.

Should it be desirable to operate the soldering attachment for test purposes or otherwise without operating the lock seamer, this result may be accomplished by throwing the control lever 114 into its right-hand position upon the drawings indicated as "hand." A circuit for direct energization of solenoid 96 is thereby established through line 122, control 114, line 128 and the connecting line 129 between the solenoid and line 121. The resultant actuation of solenoid 117 to open switch 108 will not, however, serve to de-energize solenoid 96 and stop auxiliary motor 38 because said solenoid is now energized through an independent circuit including the hand control 114.

It will be apparent from the foregoing that I have provided a control for the lock seamer and soldering attachment which will enable either machine to be operated independently of the order for test or other purposes and by which normally both the lock seamer and the soldering attachment are operated in synchronism from the main motor; but in the event of stoppage of the main motor, the soldering attachment will be continued in operation by the auxiliary motor until the can bodies are cleared from the soldering attachment.

The structural details illustrated and described may obviously be varied within considerable limits without departing from the essentials of my invention as defined in the following claims.

I claim:

1. The combination with a lock seamer and a soldering attachment including a drive shaft by which the mechanisms of the soldering attachment are driven, of a main motor connected to drive the lock seamer, a driving connection between said main motor and said shaft through which the soldering attachment is normally operated by said main motor in synchronism with the lock seamer, an auxiliary motor, and a driving connection between said auxiliary motor and said shaft, each of said driving connections including an overdrive clutch through which the soldering attachment is selectively driven by the faster running of the two motors without interference by the other motor.

2. The combination of a lock seamer, a soldering attachment, a main motor connected to drive the lock seamer, an auxiliary motor, a driving connection including an overdrive clutch between each of said motors and the soldering attachment through which the soldering attachment is driven by the faster running one of said motors, and a control system for said motors including delayed action timing switches whereby the auxiliary motor is started subsequently to the main motor and continues in operation for a predetermined interval after the main motor has been stopped.

3. The combination of a lock seamer, a soldering attachment, a main motor, an auxiliary motor, driving connections between the main motor and the lock seamer, a driving connection between the main motor and the soldering attachment through which the soldering attachment is normally operated in synchronism with the lock seamer, a driving connection between the auxiliary motor and the soldering attachment, each of said driving connections including an overdrive clutch through which the soldering attachment is operated by either motor independently of the other, and a control system for said motors including a delayed action timing switch whereby said auxiliary motor is caused to operate said soldering attachment for a predetermined period after the lock seamer has been stopped to thereby clear the soldering attachment of can bodies delivered thereto by the lock seamer.

4. The combination with a soldering attachment including a drive shaft therefor, of a main motor, an auxiliary motor, a driving connection including an overdrive clutch between each of said motors and said shaft, and a control system including at least one delayed action timing switch whereby said main motor is caused to normally operate said soldering attachment independently of the auxiliary motor and the auxiliary motor is caused to operate the soldering attachment for a predetermined period after stoppage of the main motor.

5. The combination with a soldering attachment, of a main motor, an auxiliary motor, a driving connection including an overdrive clutch between each of said motors and said soldering attachment, and a control system including at least one delayed action timing switch whereby said main motor is caused to normally operate said soldering attachment independently of the auxiliary motor and the auxiliary motor is caused to operate the soldering attachment for a predetermined period after stoppage of the main motor.

6. The combination of a lock seamer, a soldering attachment having a main drive shaft, a main motor connected to drive the lock seamer and connected through an overdrive clutch to drive the shaft of the soldering attachment whereby the lock seamer and soldering attachment are normally driven in timed relation, an auxiliary motor connected to said drive shaft through an over-drive clutch and adapted to operate at a slower speed than the main motor during normal operation of the lock seamer, and control means for starting and stopping the auxiliary motor at predetermined time intervals subsequently to the starting and stopping respectively of the main motor.

ALLAN M. CAMERON.